US012659137B2

(12) United States Patent
Augustyn et al.

(10) Patent No.: US 12,659,137 B2
(45) Date of Patent: Jun. 16, 2026

(54) HARDWARE INTEGRITY CONTROL OF AN ELECTRONIC DEVICE

(71) Applicant: ASSA ABLOY AB, Stockholm (SE)

(72) Inventors: Adam Augustyn, Krzeszowice (PL); Andrzej Bohdan Kostyk, Wieliczka (PL); Krzysztof Grzegorz Fabjanski, Bielsko-Biala (PL)

(73) Assignee: ASSA ABLOY AB, Stockholm (SE)

( * ) Notice: Subject to any disclaimer, the term of this patent is extended or adjusted under 35 U.S.C. 154(b) by 66 days.

(21) Appl. No.: 18/693,989

(22) PCT Filed: Oct. 26, 2022

(86) PCT No.: PCT/EP2022/079977
§ 371 (c)(1),
(2) Date: Mar. 21, 2024

(87) PCT Pub. No.: WO2023/073041
PCT Pub. Date: May 4, 2023

(65) Prior Publication Data
US 2024/0388421 A1 Nov. 21, 2024

(30) Foreign Application Priority Data
Oct. 26, 2021 (SE) .................................... 2151309-8

(51) Int. Cl.
*H04L 9/08* (2006.01)
*H04L 9/32* (2006.01)
(52) U.S. Cl.
CPC ............ *H04L 9/0825* (2013.01); *H04L 9/085* (2013.01); *H04L 9/3252* (2013.01)
(58) Field of Classification Search
CPC ..... H04L 9/0825; H04L 9/085; H04L 9/3252; H04L 9/3255; H04L 2209/26; H04L 63/105; G06F 21/57
See application file for complete search history.

(56) References Cited

U.S. PATENT DOCUMENTS

2007/0061897 A1* 3/2007 Holtzman ............. G06F 21/575
                                                     726/34
2015/0317480 A1* 11/2015 Gardner ................... H04L 9/32
                                                     726/2
(Continued)

FOREIGN PATENT DOCUMENTS

EP           3265943           1/2018
WO        2016141386          9/2016
(Continued)

OTHER PUBLICATIONS

Gennaro Rosario Rosario@CS CCNY Cuny Edu et al.: "Fast Multiparty Threshold ECDSA with Fast Trustless Setup", Proceedings of the 2018 IEEE/ACM International Conference On Connected Health: Applications, Systems, And Engineering Technologies, ACMPUB27, New York, NY, USA, Oct. 15, 2018 (Oct. 15, 2018).*

(Continued)

*Primary Examiner* — Khoi V Le
(74) *Attorney, Agent, or Firm* — Schwegman Lundberg & Woessner, P.A.

(57) ABSTRACT

It is provided a method for providing hardware integrity control of an electronic device (2). The method comprising: triggering (40) each one of a plurality of components (4a-d) of the electronic device to generate of respective partial secret keys (10a-d) forming part of a threshold cryptography scheme (11) associated with a public key (12), wherein a threshold number of the plurality of partial secret keys (10a-d) are required to be applied in the threshold cryptography scheme (11) for verification against the public key (12); and providing (42) the public key (12) to a hardware verification device (3). A corresponding hardware integrity device (1), computer program (67, 91) and computer program product (64, 90) are also provided.

11 Claims, 2 Drawing Sheets

(56) References Cited

U.S. PATENT DOCUMENTS

| | | | | |
|---|---|---|---|---|
| 2016/0269186 A1 * | 9/2016 | Wallrabenstein | ..... | H04L 9/3278 |
| 2017/0063559 A1 * | 3/2017 | Wallrabenstein | ....... | H04L 9/085 |
| 2020/0351089 A1 * | 11/2020 | Wentz | ................... | H04L 9/3236 |
| 2020/0353167 A1 | 11/2020 | Vivek et al. | | |
| 2021/0167969 A1 | 6/2021 | Cheon et al. | | |

FOREIGN PATENT DOCUMENTS

| | | | | |
|---|---|---|---|---|
| WO | 2019226510 | 11/2019 | | |
| WO | 2020101787 | 5/2020 | | |
| WO | WO-2020101787 A1 * | 5/2020 | ......... | H04L 63/0807 |
| WO | WO-2020185582 A1 * | 9/2020 | ........... | H04L 9/3255 |
| WO | WO-2020227403 A1 * | 11/2020 | ........... | H04L 9/3247 |
| WO | WO-2021097000 A1 * | 5/2021 | ............. | G06F 21/64 |
| WO | 2023073041 | 5/2023 | | |

OTHER PUBLICATIONS

"PCT EP 2022079977 International Application Status Report mailed Sep. 27, 2023", 2 pages.

"SE application 2151309-8 SE OA with Search Report mailed Jun. 23, 2022", 9 pages.

"PCT EP 2022079977 ISR mailed Feb. 16, 2023", 6 pages.

"PCT EP 2022079977 Written Opinion mailed Feb. 16, 2023", 9 pages.

"PCT EP 2022079977 IPRP mailed Sep. 27, 2023", 17 pages.

Gennaro, Rosario, "Fast Multiparty Threshold ECDSA with Fast Trustless Setup", Session 6C Crypto 3 CCS 2018 Toronto ON Canada, (Oct. 15-19, 2018), 16 pages.

Github, "bnb-chain tss-lib Threshold Signature Scheme, for ECDSA and EDDSA", [Online]. Retrieved from the Internet https github. com bnb-chain tss-lib, Accessed online Jun. 5, 2025, 5 pages.

Wikipedia, "Secure multi-party computation", [Online]. Retrieved from the Internet https en.wikipedia.org wiki Secure_multi-party_ computation, Accessed online Jun. 4, 2025, 13 pages.

* cited by examiner

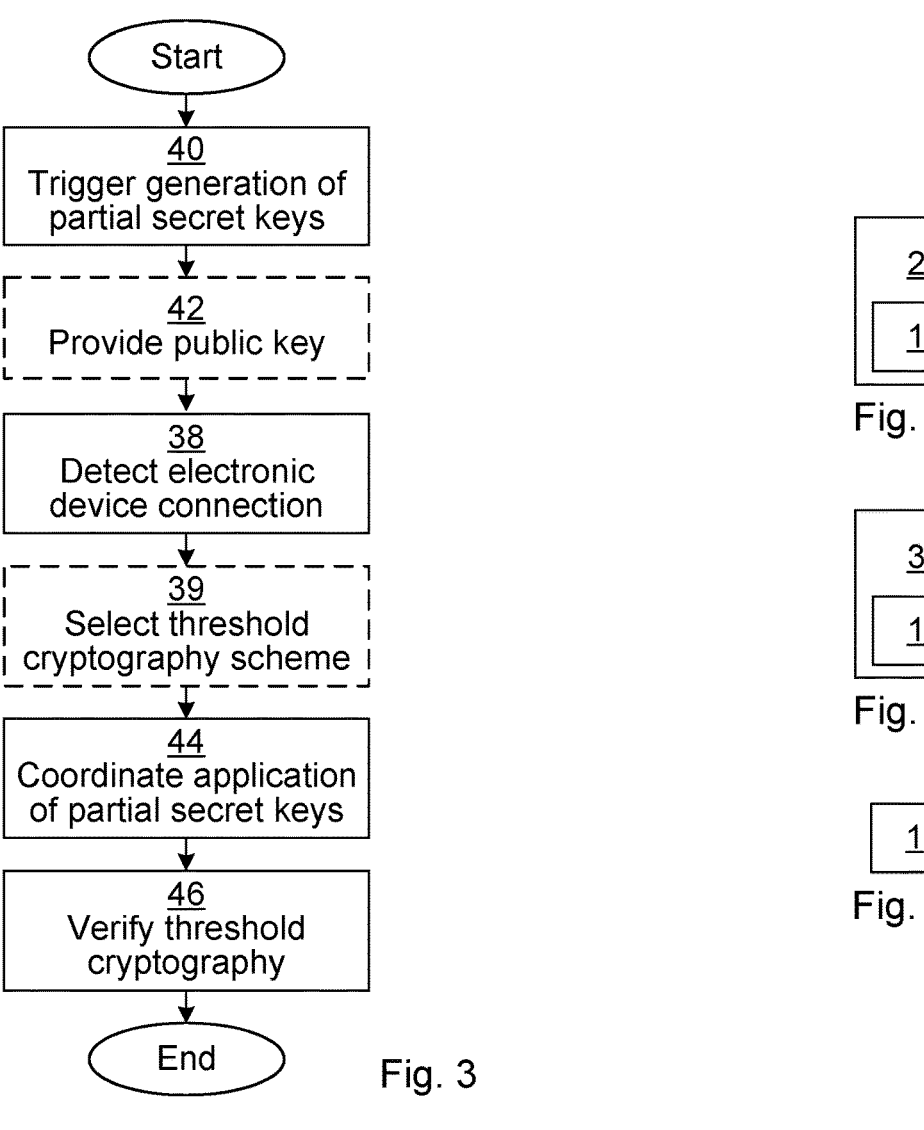
Start
40
Trigger generation of partial secret keys
42
Provide public key
38
Detect electronic device connection
39
Select threshold cryptography scheme
44
Coordinate application of partial secret keys
46
Verify threshold cryptography
End
Fig. 3
2
1
Fig. 4A
3
1
Fig. 4B
1
Fig. 4C
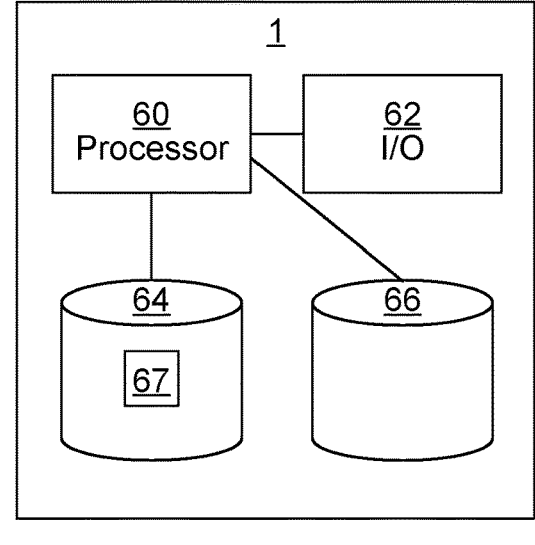
1
60
Processor
62
I/O
64
67
66
Fig. 5
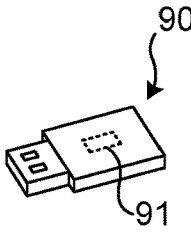
90
91
Fig. 6

HARDWARE INTEGRITY CONTROL OF AN ELECTRONIC DEVICE

CROSS-REFERENCE TO RELATED APPLICATION(S)

This application is a national stage application under 35 U.S.C. § 371 of PCT Appl. No. PCT/EP2022/079977, titled "Hardware Integrity Control of an Electronic Device," filed Oct. 26, 2022, which claims priority to Swedish Patent Appl. No. 2151309-8, filed Oct. 26, 2021, each of which is incorporated herein by reference in its entirety.

TECHNICAL FIELD

The present disclosure relates to the field of hardware integrity control of an electronic device (such as a computer) and in particular to hardware integrity control of an electronic device based on threshold cryptography.

BACKGROUND

There are many types of hardware where its integrity needs to be verified. For instance, in corporate IT infrastructures, the employees may be forbidden to replace hardware in a computer, since any new hardware can introduce a new security risk in the corporate IT infrastructure. Such a risk could be exploited by attackers to gain control of the computer, which can be a portal to the entire corporate IT network.

In order to monitor hardware, the IT department needs to keep track of all hardware of all computers or other electronic devices. For large companies, this task can easily grow out of proportion, resulting in a great amount of time and resources that are applied only for this task. It would thus be of great benefit if it could be detected when hardware components are changed in a device, without knowing the structure of the device beforehand. There are also other situations where there is great benefit to verifying hardware integrity.

SUMMARY

One object is to enable a flexible, yet secure, way to verify that a sufficient number of hardware components of an electronic device have not been replaced or removed.

According to a first aspect, it is provided a method for providing hardware integrity control of an electronic device, the method being performed by a hardware integrity device comprising a hardware verification device. The method comprises: triggering each one of a plurality of components of the electronic device to generate of respective partial secret keys forming part of a threshold cryptography scheme associated with a public key, wherein a threshold number of the plurality of partial secret keys are required to be applied in the threshold cryptography scheme for verification against the public key; detecting that the electronic device is in process of establishing access to a computer network; coordinating, with the plurality of hardware components, the application of partial secret keys; and verifying that the threshold cryptography scheme is satisfied.

The triggering to generate respective partial secret keys may comprise triggering to generate respective partial secret keys for a plurality of threshold cryptography schemes with different security levels; in which case the method further comprises: selecting one of the plurality of different threshold cryptography schemes based on the identity of the computer network. In this case, the coordinating and verifying is based on the selected threshold cryptography scheme.

The selecting may comprise selecting a threshold cryptography scheme with a higher threshold when the computer network is of higher security.

The coordinating may comprise receiving an integrity indicator, being a set of data for indicating hardware integrity, from the hardware verification device and communicating with the electronic device for at least the threshold number of hardware components of the electronic device applying respective signatures to the integrity indicator using their respective partial secret keys.

The threshold number may be less than number of the plurality of partial secret keys.

The threshold number may be equal to or greater than two.

The threshold cryptography scheme may be based on an Elliptic Curve Digital Signature Algorithm, ECDSA.

According to a second aspect, it is provided a hardware integrity device for providing hardware integrity control of an electronic device. The hardware integrity device comprises: a hardware verification device: a processor; and a memory storing instructions that, when executed by the processor, cause the hardware integrity device to: trigger each one of a plurality of components of the electronic device to generate respective partial secret keys forming part of a threshold cryptography scheme associated with a public key, wherein a threshold number of the plurality of partial secret keys are required to be applied in the threshold cryptography scheme for verification against the public key; detect that the electronic device is in process of establishing access to a computer network; coordinate, with the plurality of hardware components, the application of partial secret keys for verification by the hardware verification device; and verify that the threshold cryptography scheme is satisfied.

The instructions to trigger to generate respective partial secret keys may comprise instructions that, when executed by the processor, cause the hardware integrity device to trigger to generate respective partial secret keys for a plurality of threshold cryptography schemes with different security levels. In this case, the hardware integrity device further comprises instructions that, when executed by the processor, cause the hardware integrity device to: select one of the plurality of different threshold cryptography schemes based on the identity of the computer network. In this case, the instructions to coordinate and verify comprise instructions that, when executed by the processor, cause the hardware integrity device to coordinate and verify based on the selected threshold cryptography scheme.

The instructions to select may comprise instructions that, when executed by the processor, cause the hardware integrity device to select a threshold cryptography scheme with a higher threshold when the computer network is of higher security.

The instructions to coordinate may comprise instructions that, when executed by the processor, cause the hardware integrity device to receive an integrity indicator, being a set of data for indicating hardware integrity, from the hardware verification device; communicating with the electronic device for at least the threshold number of hardware components of the electronic device applying respective signatures to the integrity indicator using their respective partial secret keys.

The threshold number may be less than the number of the plurality of partial secret keys.

The threshold number may be equal to or greater than two.

The threshold cryptography scheme may be based on an Elliptic Curve Digital Signature Algorithm, ECDSA.

According to a third aspect, it is provided a computer program for providing hardware integrity control of an electronic device. The computer program comprises computer program code which, when executed on a hardware integrity device comprising a hardware verification device 3, causes the hardware integrity device to trigger each one of a plurality of components of the electronic device to generate respective partial secret keys forming part of a threshold cryptography scheme associated with a public key, wherein a threshold number of the plurality of partial secret keys are required to be applied in the threshold cryptography scheme for verification against the public key; detect that the electronic device is in process of establishing access to a computer network; coordinate, with the plurality of hardware components, the application of partial secret keys for verification by the hardware verification device; and verify that the threshold cryptography scheme is satisfied.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 3 is a flow chart illustrating embodiments of methods for providing hardware integrity control of an electronic device;

FIGS. 4A-C are schematic diagrams illustrating embodiments of where the hardware integrity device can be implemented;

FIG. 5 is a schematic diagram illustrating components of the validation server of FIG. 3; and FIG. 6 shows one example of a computer program product comprising computer readable means.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein exploit threshold cryptography for monitoring hardware integrity of an electronic device (e.g. a computer or other electronic device comprising multiple components with their own processing capability). As explained in more detail below, threshold cryptography enables authorisation based on any t number of n partial secret keys being applied. To set this up (when all hardware components that need to be checked are installed in the electronic device), partial keys are provided to n hardware components. For verifying integrity of the electronic device, any t out of the n hardware components need to apply their partial signature. For instance, 3 out of 4 hardware components can apply their signature to an integrity indicator. The validity of the integrity indicator can be verified according to traditional public key verification. In other words, the threshold cryptography on the secret side (the monitored electronic device) does not result in any different processing on the verification side, making the implementation of the verification simple.

Figure 1:
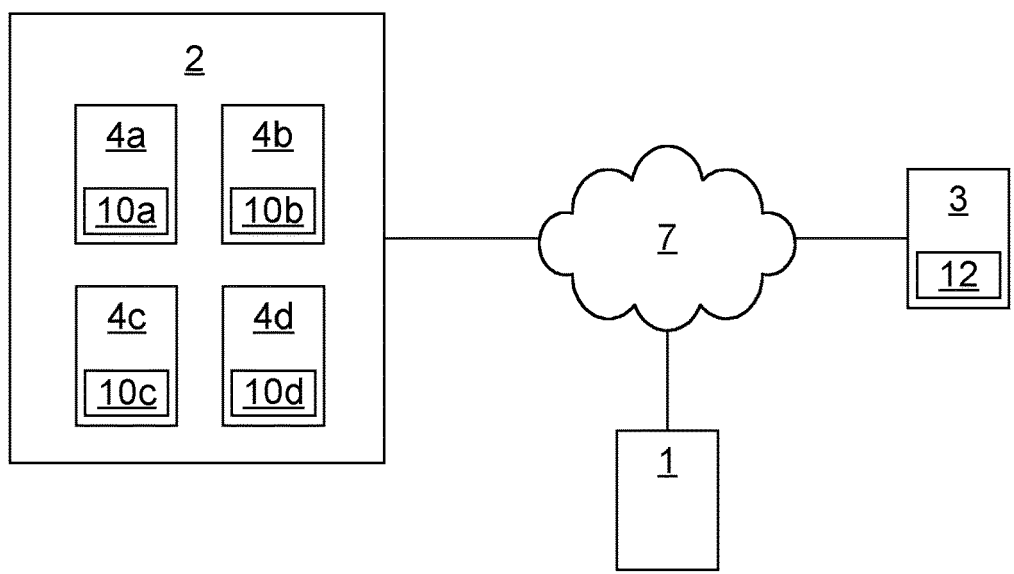
FIG. 1 is a schematic diagram illustrating an environment in which embodiments presented herein can be applied.

FIG. 1 is a schematic diagram illustrating an environment in which embodiments presented herein can be applied. An electronic device 2 is an electronic device comprising components with separate processing capability. For instance, the electronic device can be a computer device of any suitable form, such as a desktop computer, laptop computer, tablet computer, smartphone or even a wearable device. The electronic device 2 could alternatively be a special purpose device, e.g. vending machine, ATM (automatic teller machine), IoT (Internet of Things) device, etc. The electronic device 2 is connected to a communication network 7, such as the Internet.

The electronic device 2 comprises a plurality of hardware components 4a-d. Each hardware component comprises some form of processing capability to be able to apply partial secret keys 10a-d, as explained in more detail below. In the example of FIG. 1, the hardware components 4a-d are illustrated as a first hardware component 4a being a persistent storage device (e.g. a solid-state drive or hard drive), a second hardware component 4b being a central processing unit (CPU), a third hardware component 4c being a graphics processing unit (GPU), and a fourth hardware component 4d being an input/output device 4d. There can of course be many other hardware components, e.g. motherboard, fingerprint reader, smartcard reader, etc.

A hardware integrity device 1 is used to set up hardware integrity control of the electronic device 2. In order to set up the hardware integrity control, the hardware integrity device 1 triggers the generation of partial secret keys 10a-d by the respective hardware components 4a-d of the electronic device 2 that can make use of the partial secret keys 10a-d. Each one of the hardware components 4a-d comprise some sort of processing capability to be able to apply its respective partial secret key 10a-d. The hardware integrity device 1 generates a corresponding public key 12 of the threshold cryptography scheme and provides the public key 12 to the hardware verification device 3.

As explained in more detail below, when needed, the hardware components 4a-d apply their respective partial secret keys 10a-d to apply a cryptographic signature to an integrity indicator (being a set of data for indicating hardware integrity). The signature of the integrity indicator can then be verified by the hardware verification device 3 by checking against the public key 12, to thereby implicitly determine whether the threshold condition of the threshold cryptography has been met. In other words, if at least the threshold number t of partial secret keys has been applied (as defined when the threshold cryptography scheme was set up), the public key verification is positive.

One use case for this hardware check of an electronic device in the form of a computer is in a corporate computer infrastructure, where it thus can be verified that individual computer users do not replace or remove hardware, which could lead to security risks. The hardware integrity verification can e.g. occur as part of connecting to a corporate network e.g. over a LAN (Local Area Network) or a VPN (Virtual Private Network) connection. Another use case is an electronic lock that verifies hardware integrity of itself, i.e. that nobody has removed or replaced any lock hardware, in conjunction with performing access control. Another use case is that the operating system of a computer verifies that all (or threshold number) of hardware entities are present as part of the boot process. This can be particularly useful for high security computers, e.g. for use in the military or intelligence agencies. Another use case is for video on demand (VoD) or other streaming services, where the streaming provider can verify that the receiving computer has not had hardware modifications, e.g. for being able to download protected content.

Figure 2:
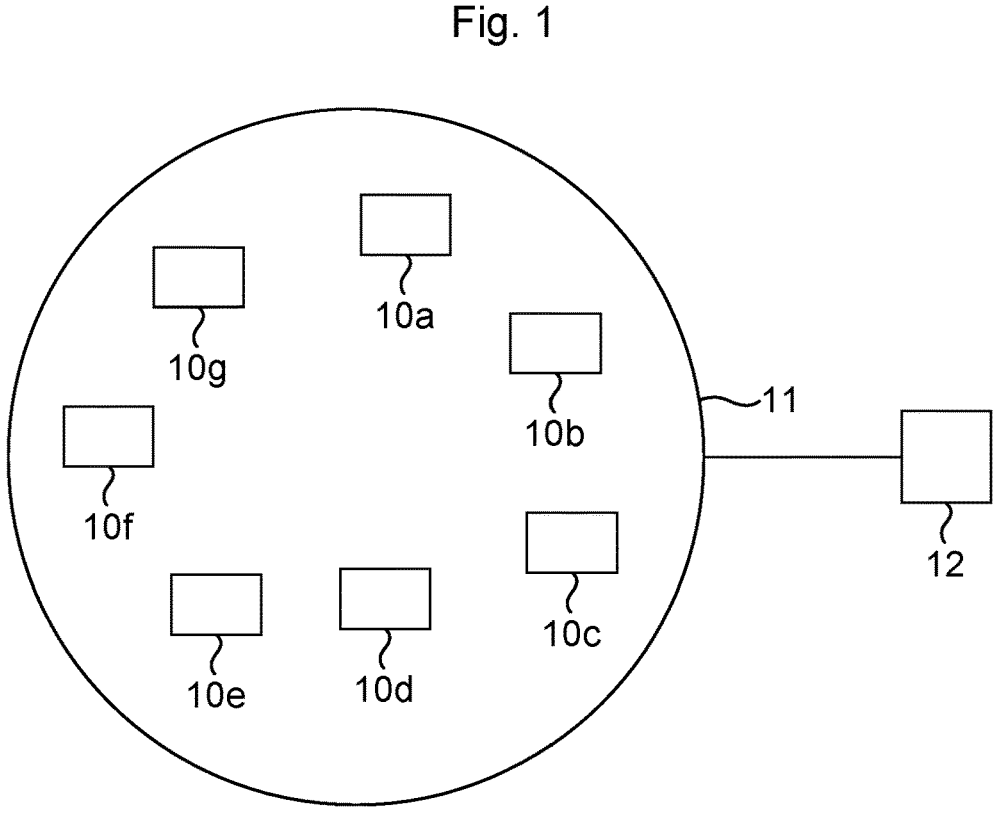
FIG. 2 is a schematic diagram illustrating the concept of threshold cryptography.

FIG. 2 is a schematic diagram illustrating the concept of threshold cryptography, which is employed by embodiments presented herein.

Starting with a summary of traditional asymmetric cryptography, there is a key pair consisting of a public key and a secret key. The public key is associated with an entity or user and is shared publicly. The secret key is coupled to the public key, but the secret key is kept secret. Using the secret key, an electronic device can perform a cryptographic operation, e.g. cryptographic signing or decryption, which can be used to verify hardware integrity.

A development in asymmetric cryptography, from its original key pair of a secret key and a public key, is threshold cryptography. In threshold cryptography, there is still a single public key 12, but cryptographic operations are achieved by a threshold number of associated partial secret keys 10a-d. or respective entities. Jointly, the group of entities computes and communicates to generate the set of partial secret keys and the associated public key. It is to be noted that each partial secret key is secret and is only known to the entity itself. There is no need for this partial secret key to be exposed to any other entity, not even in the key creation phase. Hence, there is no need for a central authority that distributes these partial secret keys.

The threshold condition can be expressed as (t, n), where n denotes the number of available partial secret keys and t denotes the number of partial secret keys that are needed to perform a cryptographic operation (e.g. signing or decryption) corresponding to the (single) public key. For instance, in correspondence with the example of FIG. 1, a (3, 4) threshold cryptography scheme requires that at least 3 out of 4 associated partial secret keys 10a-d are applied to perform the cryptographic operation. When at least the threshold number of partial secret keys are applied, this cryptographic operation, that is secured by the threshold cryptography scheme 11, is performed. It does not matter which ones of the partial secret keys that are applied, as long as at least the threshold number of partial secret keys are applied. The threshold scheme is defined when the partial secret keys are generated.

Optionally, the partial secret keys can be refreshed. This can be done to limit the lifetime of the partial secret keys, (which makes it even harder for an attacker who needs to compromise at least t parties within a time window defined by the lifetime). The refresh can also be performed to consolidate the partial secret keys. For instance, if an entity holding a partial secret key is lost, it makes sense to regenerate the partial secret keys now for the remaining entities of the group. It is to be noted that the refresh does not affect the public key—the same public key that was used prior to the refresh can be used after the refresh. Again, the refresh is performed without sharing any of the partial secret keys while doing the collaborative refresh computation, e.g. based on multi-party computation, known in the art per se, see the Wikipedia article https://en.wikipedia.org/wiki/Secure_multi-party_computation available at the time that this patent application is filed.

Using threshold cryptography, a compromise of a single device never leads to a compromise of the whole threshold cryptography scheme, significantly increasing security.

Threshold cryptography can e.g. be implemented using an Elliptic Curve Digital Signature Algorithm (ECDSA). An example implementation is the Binance implementation, available at https://github.com/binance-chain/tss-lib at the time of filing of this patent application.

FIG. 3 is a flow chart illustrating embodiments of methods for providing hardware integrity control of an electronic device 2. The method is performed by a hardware integrity device 1 comprising a hardware verification device 3. It is to be noted that the same hardware can be used for the hardware integrity device 1 and the hardware verification device 3, whereby it is the software instructions that provide the different functions that are described for the hardware integrity device 1 and the hardware verification device 3 described herein.

In a trigger generation of partial secret keys step 40, the hardware integrity device 1 triggers each one of a plurality of components (4a-d) of the electronic device to generate of respective partial secret keys 10a-d forming part of a threshold cryptography scheme 11 associated with a public key 12. A threshold number of the plurality of partial secret keys 10a-d are required to be applied in the threshold cryptography scheme 11 for verification against the public key 12.

As explained above, the threshold cryptography scheme 11 can e.g. be based on an Elliptic Curve Digital Signature Algorithm (ECDSA).

In an optional provide public key step 42, the hardware integrity device 1 provides the public key 12 to a hardware verification device 3. This enables the hardware verification device 3 to verify when the threshold number of partial secret keys have been applied, using the public key 12. Since the hardware verification device 3 and the hardware integrity device are provided using the same hardware, this step can be a case of internal signalling between software modules.

Optionally, this step comprises triggering to generate respective partial secret keys for a plurality of threshold cryptography schemes 11 with different security levels, e.g. where a higher threshold implies higher security since more components would then need to apply their partial secret keys for the threshold cryptography scheme to be satisfied.

In a detect electronic device connection step 38, the hardware integrity device detects that the electronic device 2 is in process of establishing access to a computer network. This can e.g. be detected by the electronic device 2 connecting to the computer network in the form of a local area network (LAN) or virtual private network (VPN), e.g. as part of a corporate network. Such computer networks often have processing that occurs on the network side as part of the electronic device 2 establishing a connection to the computer network. The processing of this method can be performed in that context.

In an optional select threshold cryptography scheme step 39, hardware integrity device 1 selects one of the plurality of different threshold cryptography schemes based on the identity of the computer network. For instance, the selecting can comprise selecting a threshold cryptography scheme 11 with a higher threshold when the computer network is of higher security.

In a coordinate application of partial secret keys step 44, the hardware integrity device 1 coordinates, with the plurality of hardware components 4a-d, the application of partial secret keys 10a-d for verification by the hardware verification device 3. This coordination can be based on several sub-steps. First, the hardware integrity device 1 receives an integrity indicator, being a set of data for indicating hardware integrity, from the hardware verification device 3. Second, the hardware integrity device 1 communicates with the electronic device 2 for at least the threshold number of hardware components 4a-d of the electronic device 2 applying respective signatures to the integrity indicator using their respective partial secret keys 10a-d. The resulting, cryptographically signed, integrity indicator is then provided to the hardware verification device 3 either by the electronic device directly, or via the hardware integrity device 1.

The integrity indicator can be generated by the hardware verification device 3, such that the integrity indicator comprises a newly generated random, or difficult to guess, number, to ensure that the signature is recently applied.

The threshold number can be less than the number of the plurality of partial secret keys 10a-d, whereby not all of the hardware components 4a-d need to apply their respective partial secret keys 10a-d. The threshold number is equal to or greater than two. This ensures that no single hardware component can be used to apply a valid complete signature to an integrity indicator. In one embodiment, the threshold number is equal to the number of the plurality of partial secret keys 10a-d, whereby all of the hardware components 4a-d need to apply their respective partial secret keys 10a-d for valid signing (or decryption), which can be verified (or encrypted) using the public key.

When the threshold number of the plurality of partial secret keys 10a-d have been applied, the hardware verification device 3 can verify that the required number of hardware components are present in the electronic device, in accordance with the threshold cryptography scheme. As mentioned above, this verification is based on the public key 12 corresponding to the threshold cryptography scheme.

It is to be noted that a single electronic device can be part of different threshold cryptography schemes that are applied depending on the situation. For instance, a computer can be configured in a first threshold cryptography scheme having a threshold of 3 of 4 components applying their respective partial secret keys. In parallel, the same computer can be configured in a second threshold cryptography scheme having a threshold of 4 of 4 components applying their respective partial secret keys. The first cryptography scheme could e.g. be applied for a general access to a corporate network while the second cryptography scheme could be applied for access to a particularly sensitive network.

In a verify threshold cryptography step 46, the hardware integrity device 1 verifies that the threshold cryptography scheme 11 is satisfied. When the threshold cryptography scheme is satisfied, the hardware integrity device 1 enables the electronic device 2 to connect to the computer network. When the threshold cryptography scheme is not satisfied, the hardware integrity device 1 blocks the electronic device 2 from connect to the computer network.

When the select threshold cryptography scheme step 39 is performed, the coordinate application of partial secret keys step 44 of and the verify threshold cryptography step 46 are based on the threshold cryptography scheme selected in the select threshold cryptography scheme step 39.

Using embodiments presented herein, threshold cryptography is used to ensure that a sufficient number of hardware components of an electronic device have not been replaced or removed since the partial secret keys 10a-d were provided to the hardware components 4a-d by the hardware integrity device 1.

The hardware verification device 3 does not need to know how many hardware components 4a-d that are involved or required; the verification using the public key is a conventional verification of possession of the secret key, even if the secret key is based on threshold cryptography, i.e. at least a threshold number of partial secret keys have been applied.

FIGS. 4A-C are schematic diagrams illustrating embodiments of where the hardware integrity device 1 can be implemented.

In FIG. 4A, the hardware integrity device 1 shown as implemented in the electronic device 2. The electronic device 2 is thus the host device for the hardware integrity device 1 in this implementation. Hence, the electronic device 2 then triggers the generation of the partial secret keys and the public key, and provides the public key to the hardware verification device 3.

In FIG. 4B, the hardware integrity device 1 shown as implemented in the hardware verification device 3. The hardware verification device 3 is thus the host device for the hardware integrity device 1 in this implementation. In this embodiment, it is the hardware verification device 3 that triggers the generation the partial secret keys and the public key, and provides the partial secret keys to the electronic device and its components 4a-d.

In FIG. 4C, the hardware integrity device 1 is shown as implemented as a stand-alone device. The hardware integrity device 1 thus does not have a host device in this implementation. In this embodiment, the hardware integrity device 1 triggers generation of the partial secret keys and the public key, provides the partial secret keys to the electronic device and its components 4a-d and provides the public key to the hardware verification device 3.

FIG. 5 is a schematic diagram illustrating components of the hardware integrity device 1 of FIG. 1 and FIGS. 4A-C. It is to be noted that when the hardware integrity device 1 is implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The hardware integrity device 1 further comprises an I/O interface 62 for communicating with external and/or internal entities.

Other components of the hardware integrity device 1 are omitted in order not to obscure the concepts presented herein.

FIG. 6 shows one example of a computer program product 90 comprising non-transitory computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

Here now follows a set of items for describing embodiments.

A1. A method for providing hardware integrity control of an electronic device, the method being performed by a hardware integrity device, the method comprising:

triggering each one of a plurality of components of the electronic device to generate of respective partial secret keys forming part of a threshold cryptography scheme associated with a public key, wherein a threshold number of the plurality of partial secret keys are required to be applied in the threshold cryptography scheme for verification against the public key; and providing the public key to a hardware verification device.

A2. The method according to item A1, further comprising:

coordinating, with the plurality of hardware components, the application of partial secret keys for verification by the hardware verification device.

A3. The method according to item A2, wherein the coordinating comprises receiving an integrity indicator, being a set of data for indicating hardware integrity, from the hardware verification device and communicating with the electronic device for at least the threshold number of hardware components of the electronic device applying respective signatures to the integrity indicator using their respective partial secret keys.

A4. The method according to any one of the preceding items, wherein the threshold number is less than number of the plurality of partial secret keys.

A5. The method according to any one of the preceding items, wherein the threshold number is equal to or greater than two.

A6. The method according to any one of the preceding items, wherein the threshold cryptography scheme is based on an Elliptic Curve Digital Signature Algorithm, ECDSA.

A7. A hardware integrity device for providing hardware integrity control of an electronic device, the hardware integrity device comprising:

a processor; and a memory storing instructions that, when executed by the processor, cause the hardware integrity device to:

trigger each one of a plurality of components of the electronic device to generate respective partial secret keys forming part of a threshold cryptography scheme associated with a public key, wherein a threshold number of the plurality of partial secret keys are required to be applied in the threshold cryptography scheme for verification against the public key; and provide the public key to a hardware verification device.

A8. The hardware integrity device according to item A7, further comprising instructions that, when executed by the processor, cause the hardware integrity device to:

coordinate, with the plurality of hardware components, the application of partial secret keys for verification by the hardware verification device.

A9. The hardware integrity device according to item A8, wherein the instructions to coordinate comprise instructions that, when executed by the processor, cause the hardware integrity device to receive an integrity indicator, being a set of data for indicating hardware integrity, from the hardware verification device; communicating with the electronic device for at least the threshold number of hardware components of the electronic device applying respective signatures to the integrity indicator using their respective partial secret keys.

A10. The hardware integrity device according to any one of items A7 to A9, wherein the threshold number is less than the number of the plurality of partial secret keys.

A11. The hardware integrity device according to any one of items A7 to A10, wherein the threshold number is equal to or greater than two.

A12. The hardware integrity device according to any one of items A7 to A11, wherein the threshold cryptography scheme is based on an Elliptic Curve Digital Signature Algorithm, ECDSA.

A13. A computer program for providing hardware integrity control of an electronic device, the computer program comprising computer program code which, when executed on a hardware integrity device causes the hardware integrity device to:

a processor; and a memory storing instructions that, when executed by the processor, cause the hardware integrity device to:

trigger each one of a plurality of components of the electronic device to generate respective partial secret keys forming part of a threshold cryptography scheme associated with a public key, wherein a threshold number of the plurality of partial secret keys are required to be applied in the threshold cryptography scheme for verification against the public key; and provide the public key to a hardware verification device.

A14. A computer program product comprising a computer program according to item A13 and a computer readable means comprising non-transitory memory in which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for providing hardware integrity control of an electronic device, the method being performed by a hardware integrity device comprising a hardware verification device, the method comprising:

triggering each one of a plurality of hardware components of the electronic device to generate respective partial secret keys for each of a plurality of threshold cryptography schemes with different security levels, wherein each threshold cryptography scheme is associated with a public key and a threshold number of the respective partial secret keys corresponding to the threshold cryptography scheme are required to be applied in the threshold cryptography scheme for verification against the public key;

detecting that the electronic device is in process of establishing access to a computer network;

selecting one of the plurality of threshold cryptography schemes based on an identity of the computer network;

coordinating, with the plurality of hardware components, the application of partial secret keys by the respective hardware components based on the selected threshold cryptography scheme, wherein the coordinating comprises:

receiving an integrity indicator, being a set of data for indicating hardware integrity, from the hardware verification device, and communicating with the electronic device for at least the threshold number of hardware components of the electronic device applying respective signatures to the integrity indicator using their respective partial secret keys; and verifying that the selected threshold cryptography scheme is satisfied.

2. The method according to claim 1, wherein the selecting comprises selecting one of the plurality of threshold cryptography schemes with a higher threshold when the computer network is of higher security.

3. The method according to claim 1, wherein, for each of at least one of the threshold cryptography schemes, the threshold number is less than a number of the respective partial secret keys corresponding to the threshold cryptography scheme.

4. The method according to claim 1, wherein the threshold number is equal to or greater than two.

5. The method according to claim 1, wherein one or more of the threshold cryptography schemes is based on an Elliptic Curve Digital Signature Algorithm, ECDSA.

6. A hardware integrity device for providing hardware integrity control of an electronic device, the hardware integrity device comprising:

a hardware verification device;

a processor; and a memory storing instructions that, when executed by the processor, cause the hardware integrity device to:

trigger each one of a plurality of hardware components of the electronic device to generate respective partial secret keys for each of a plurality of threshold cryptography schemes with different security levels, wherein each threshold cryptography scheme is associated with a public key and a threshold number of the respective partial secret keys corresponding to the threshold cryptography scheme are required to be applied in the threshold cryptography scheme for verification against the public key;

detect that the electronic device is in process of establishing access to a computer network;

select one of the plurality of threshold cryptography schemes based on an identity of the computer network;

coordinate, with the plurality of hardware components, the application of partial secret keys by the respective hardware components based on the selected threshold cryptography scheme, for verification by the hardware verification device, wherein the coordinating comprises:

receiving an integrity indicator, being a set of data for indicating hardware integrity, from the hardware verification device, and communicating with the electronic device for at least the threshold number of hardware components of the electronic device applying respective signatures to the integrity indicator using their respective partial secret keys; and verify that the selected threshold cryptography scheme is satisfied.

7. The hardware integrity device according to claim 6, wherein the instructions to select comprise instructions that, when executed by the processor, cause the hardware integrity device to select one of the plurality of threshold cryptography schemes with a higher threshold when the computer network is of higher security.

8. The hardware integrity device according to claim 6, wherein, for each of at least one of the threshold cryptography schemes, the threshold number is less than a number of the respective partial secret keys corresponding to the threshold cryptography scheme.

9. The hardware integrity device according to claim 6, wherein the threshold number is equal to or greater than two.

10. The hardware integrity device according to claim 6, wherein one or more of the threshold cryptography schemes is based on an Elliptic Curve Digital Signature Algorithm, ECDSA.

11. A non-transitory computer readable medium storing a computer program for providing hardware integrity control of an electronic device, the computer program comprising computer program code which, when executed on a hardware integrity device comprising a hardware verification device, causes the hardware integrity device to:

trigger each one of a plurality of hardware components of the electronic device to generate respective partial secret keys for each of a plurality of threshold cryptography schemes with different security levels, wherein each threshold cryptography scheme is associated with a public key and a threshold number of the plurality of partial secret keys are required to be applied in the threshold cryptography scheme for verification against the public key;

detect that the electronic device is in process of establishing access to a computer network;

select one of the plurality of threshold cryptography schemes based on an identity of the computer network;

coordinate, with the plurality of hardware components, the application of partial secret keys by the respective hardware components based on the selected threshold cryptography scheme, for verification by the hardware verification device, wherein the coordinating comprises:

receiving an integrity indicator, being a set of data for indicating hardware integrity, from the hardware verification device, and communicating with the electronic device for at least the threshold number of hardware components of the electronic device applying respective signatures to the integrity indicator using their respective partial secret keys; and verify that the selected threshold cryptography scheme is satisfied.

\* \* \* \* \*